US006188009B1

(12) United States Patent
Saito et al.

(10) Patent No.: US 6,188,009 B1
(45) Date of Patent: Feb. 13, 2001

(54) ELECTRONIC MUSICAL INSTRUMENT WITH HELP FUNCTION

(75) Inventors: Tsutomu Saito; Shu Eitaki, both of Hamamatsu (JP)

(73) Assignee: Kabushiki Kaisha Kawai Gakki Seisakusho, Hamamatsu (JP)

( * ) Notice: Under 35 U.S.C. 154(b), the term of this patent shall be extended for 0 days.

(21) Appl. No.: 09/413,328

(22) Filed: Oct. 7, 1999

(30) Foreign Application Priority Data

Oct. 9, 1998 (JP) ........................................ 10-287804

(51) Int. Cl.[7] ........................................ G09B 15/02
(52) U.S. Cl. ........................................ 84/477 R
(58) Field of Search ........................ 84/470 R, 471 R, 84/477 R, 478

(56) References Cited

U.S. PATENT DOCUMENTS 5,361,672 * 11/1994 Koyama ........................ 84/478

FOREIGN PATENT DOCUMENTS 5-204301 8/1993 (JP) .
7-253779 10/1995 (JP) .

* cited by examiner

*Primary Examiner*—Stanley J. Witkowski
(74) *Attorney, Agent, or Firm*—Christie, Parker & Hale, LLP

(57) ABSTRACT

An electronic musical instrument has play modes and a help function in which a help picture is displayed in accordance with each of the play modes. When the help function is started by operating a help switch in the instrument being operating in a normal play mode, a picture for selecting one of the play modes is displayed on a display. When the help function is started in a play mode but the normal play mode, a help picture corresponding to the play mode is displayed at once. A sequence of operations for obtaining a help picture can be stored in a storing medium.

10 Claims, 11 Drawing Sheets

ELECTRONIC MUSICAL INSTRUMENT WITH HELP FUNCTION

BACKGROUND OF THE INVENTION

1. [Field of the Invention]

The present invention relates to electronic musical instruments with help functions, particularly to electronic musical instruments each including a sound source for producing musical sounds in an electronic manner, and a display for giving explanations of various functions in the instrument.

2. [Description of the Related Art]

Various electronic musical instruments with help functions have been proposed heretofore. For example, in Japanese Patent Application Laid-open No. 204301/1993 "Explanation Device in Electronic Musical Instrument", an explanation of the function assigned to an operation member is given with a voice or a picture when the operation member is operated in a help mode after a help switch is made on.

In Japanese Patent Application Laid-open No. 253779/1995 "Electronic Musical Instrument", given is an explanation of the function assigned to an assignable switch. When a help operation member is operated after the switch is operated, an explanation related to the switch is given on a display.

Although the above Japanese Patent Application Laid-open Nos. 204301/1993 and 253779/1995 are different in details, they are basically the same in the point that an explanation of the function related to an individual switch is given after a help switch is made on.

In short, any conventional electronic musical instrument with a help function is not designed to explain its functions systematically. The most ordinary method for grasping the functions of the electronic musical instrument, i.e., the method of searching from a rough category to a minute category in order can not be taken therefore. For this reason, a textbook such as an owner's manual can not be disused though the electronic musical instrument has the help function.

SUMMARY OF THE INVENTION

It is an object of the present invention to provide an electronic musical instrument with a help function capable of giving explanations of its functions in an appropriate order.

According to the present invention, an electronic musical instrument has play modes and a help function in which a help picture is displayed in accordance with each of the play modes. The play modes include a normal play mode. The electronic musical instrument comprises help function instruction means for instructing to start the help function; help function start means for starting the help function when it is instructed with the help function instruction means; and display control means for displaying a picture for selecting one of the play modes when the help function is started in the normal play mode, and a help picture corresponding to one of the play modes but the normal play mode when the help function is started in the corresponding play mode.

According to another aspect of the present invention, an electronic musical instrument comprises storage means for storing a sequence of operations performed after the help function is started till a predetermined help picture is displayed; reproduction means for reproducing a sequence of operations stored in the storage means; and display control means for displaying a predetermined help picture in accordance with a sequence of operations reproduced by the reproduction means.

According to still another aspect of the present invention, an electronic musical instrument comprises storage means for storing information for introducing a predetermined help picture of a predetermined mode of the help function; reproduction means for reading out information on the predetermined help picture of the predetermined mode from the storage means; and display control means for displaying the predetermined help picture based on information read out through the reproduction means.

DETAILED DESCRIPTION OF THE PREFERRED EMBODIMENT

Figure 1:
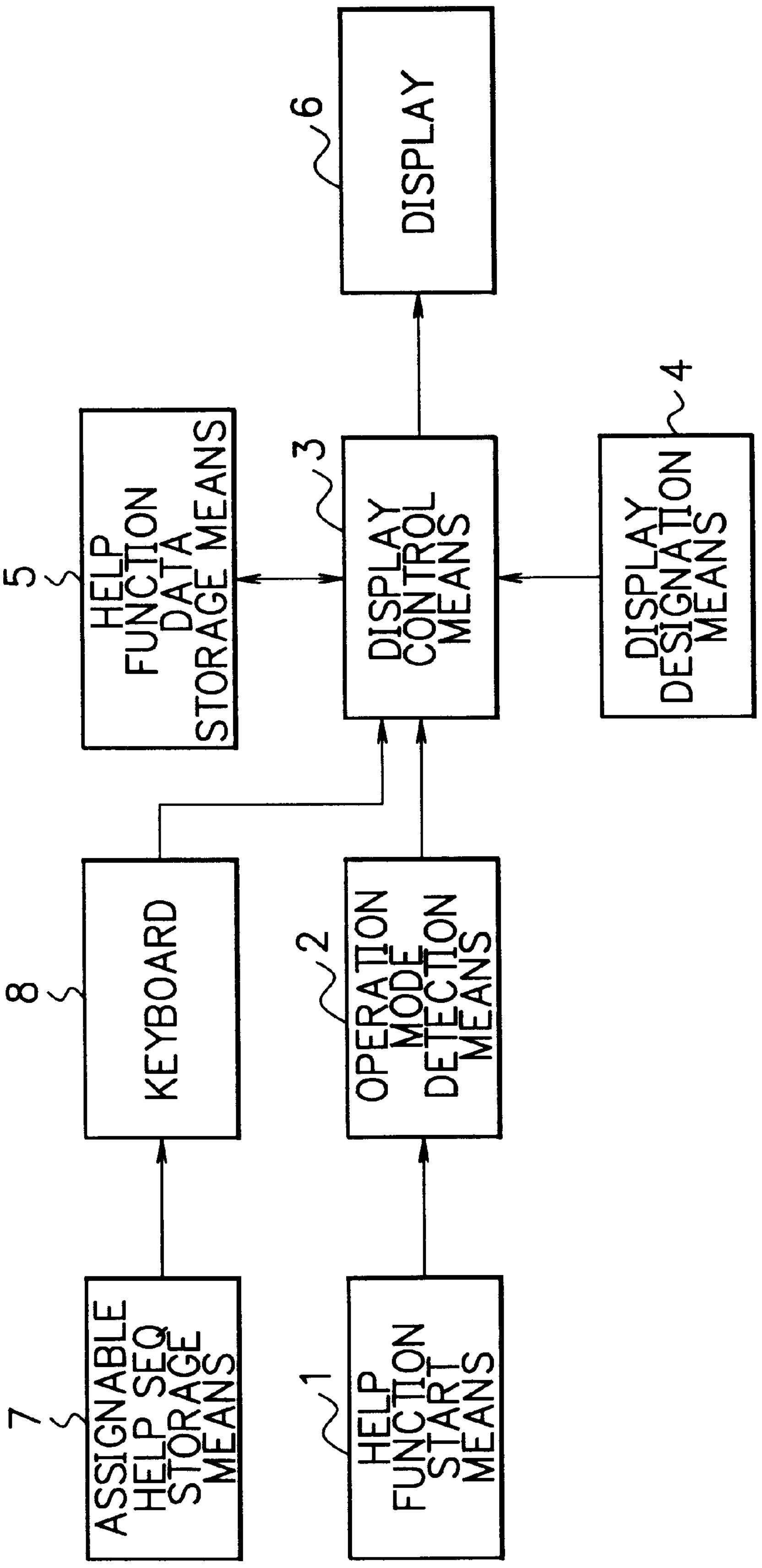
FIG. 1 is a block diagram showing the main functional components in an electronic musical instrument with a help function according to an embodiment of the present invention.

Hereinafter, an electronic musical instrument with a help function according to an embodiment of the present invention will be described with reference to drawings. FIG. 1 shows the main functional components in the electronic musical instrument for executing the help function.

Referring to FIG. 1, the electronic musical instrument includes help function start means 1, operation mode detection means 2, display control means 3, display designation means 4, help function data storage means 5, display means 6, assignable help sequence (SEQ) storage means 7, and keyboard 8.

Help function start means 1 is for starting the help function in the electronic musical instrument. The help function is started when help switch 11 (see FIG. 3) comprising help function instruction means is depressed (made on).

Operation mode detection means 2 is for detecting an operation mode (play mode) when help function start means 1 is operated.

Display control means 3 is for displaying a picture on display means 6 in accordance with the operation mode detected by operation mode detection means 2. Data displayed in a help picture on display means 6 is stored in help function data storage means 5.

Display designation means 4 is for designating an item to be explained from among items in a picture displayed on display means 6. The explanation data designated with display designation means 4 is read out from help function data storage means 5 through display control means 3 and displayed on display means 6.

Assignable help SEQ storage means 7 is for storing a sequence of operations in time order from the start of the help function. Such a sequence is stored in the state of being assigned to a predetermined key on keyboard 8. The explanation content of the last stored help picture in the sequence can be displayed at once by operating the assigned key, for example.

In operating in the help mode, the electronic musical instrument according to this embodiment is fundamentally intent to a help process differently from an ordinary play mode. This makes it possible to relieve a load on a microprocessor and to improve the real-time performance. If a user likes to make the electronic musical instrument operate in an ordinary play mode, he or she should perform an operation for ending the help mode.

An outline of the process of the help function will be described next with reference to a flowchart of FIG. 2, though details thereof will be described later with reference to FIGS. 7 to 10.

Figure 2:
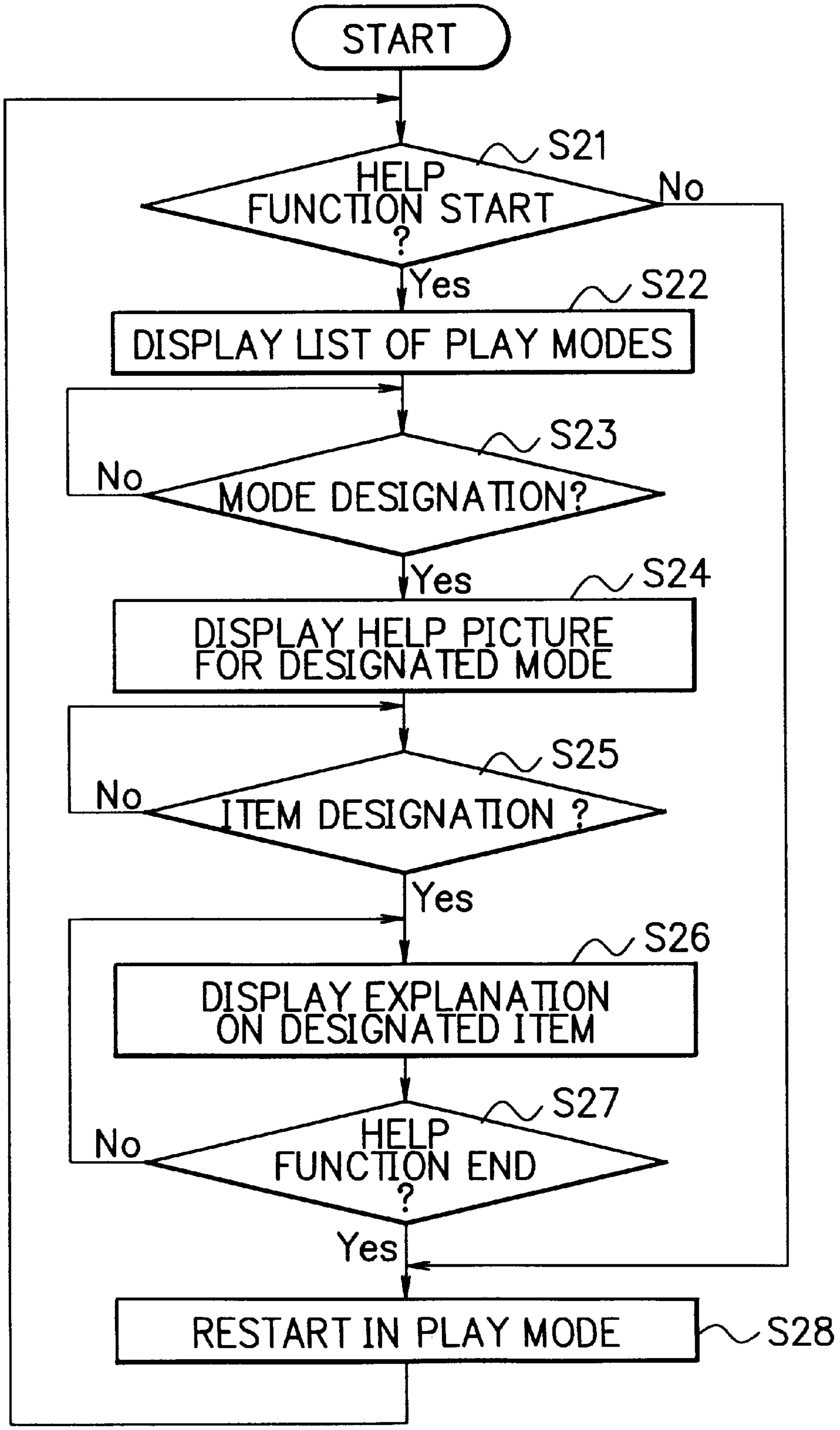
FIG. 2 is a flowchart showing an outline of the process of the help function of the electronic musical instrument.

Referring to FIG. 2, while the electronic musical instrument of this embodiment is operating in an ordinary play mode, it is always checked in step S21 whether or not an operation for starting the help function has been performed. When such an operation is not detected, the electronic musical instrument keeps operating in the ordinary play mode.

When an operation for starting the help function is detected in step S21, the flow then advances to step S22, wherein a list of play modes of this electronic musical instrument is displayed on display means 6.

Next, in step S23, it is checked whether or not an operation for designating one of the play modes displayed on display means 6 has been performed. When such an operation is detected, the flow then advances to step S24, wherein a help picture peculiar to the designated play mode is displayed on display means 6.

Next, in step S25, it is checked whether or not an item is designated from among items in the help picture displayed on display means 6. When an item is designated, the flow then advances to step S26, wherein an explanation on function related to the designated item is displayed on display means 6.

The process of step S26 is repeated until an operation for ending the help function is detected in step S27. When such an operation is detected, the flow then advances to step S28, wherein the electronic musical instrument is made to operate in the same play mode as that when the help function is started. Also after this, it is always checked in step S21 whether or not an operation for starting the help function has been performed. Every time such an operation is detected, the process of steps S22 to S28 is executed.

The flowchart of FIG. 2 is for illustrating the base process so various modifications of the process can be considered. For example, in case that the electronic musical instrument is operating in a play mode other than a normal play mode when the help function is started, it may be possible to skip the first help picture of a table of general contents, and display at once an exclusive picture of a table of contents only for the play mode at the time of the help function being started.

It may be also possible to return to the first help picture, that is a mode selection picture for the whole electronic musical instrument, when the exclusive picture is displayed and a predetermined switch assigned beforehand is operated.

Further, it is also possible to display at once the explanation content of the last help picture in a sequence of operations after the help function is started, by storing the sequence with being assigned to a predetermined key, as described above.

Next, the electronic musical instrument with the help function according to this embodiment will be described in more detail with reference to FIGS. 3 to 11.

Figure 3:
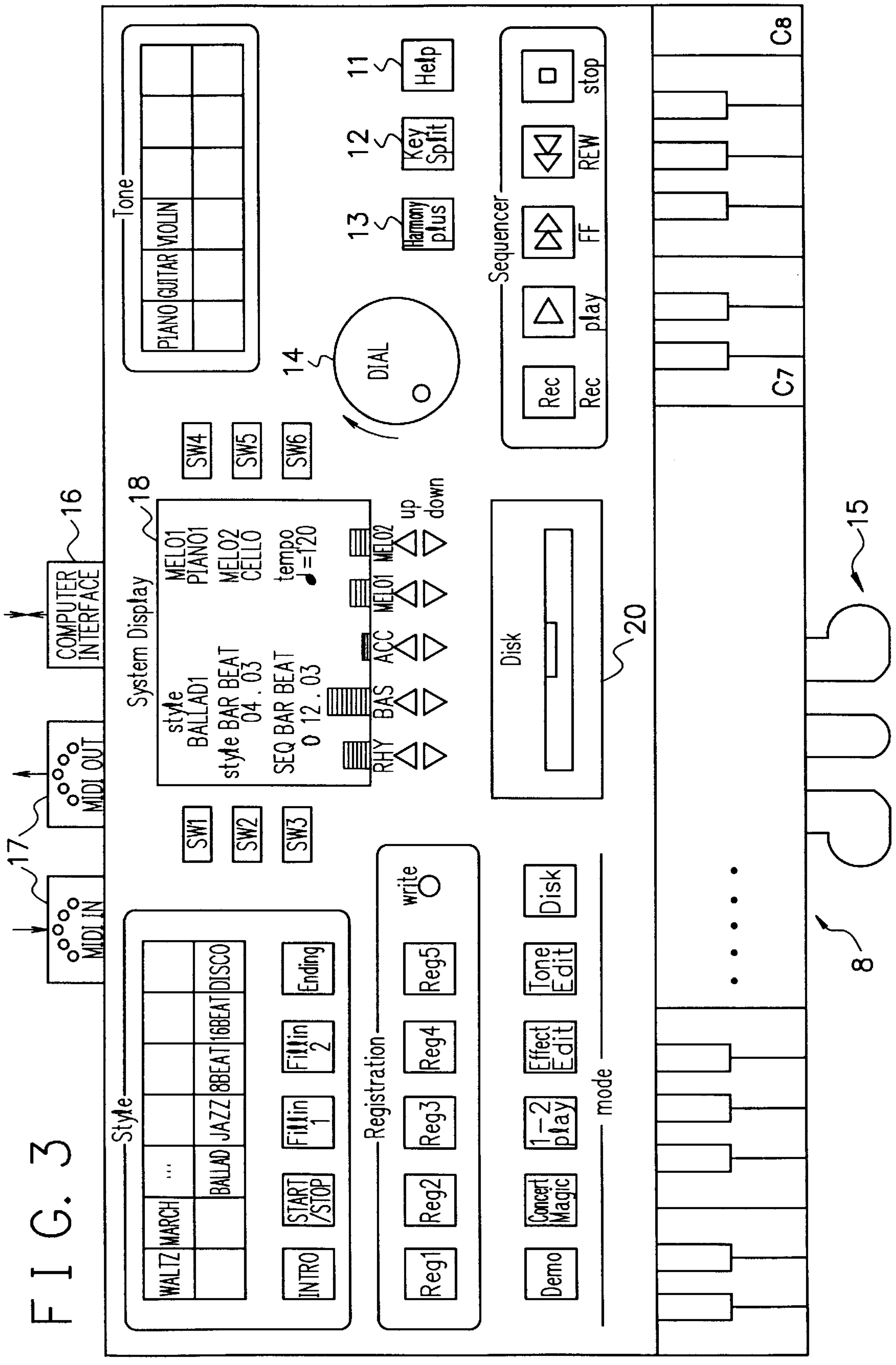
FIG. 3 is a schematic plan view of the electronic musical instrument.

FIG. 3 shows the main part of the electronic musical instrument of this embodiment. In this embodiment, half of keys on keyboard 8 that are ordinarily used for playing are assigned various roles in the help function and used as function switches, for example.

Referring to FIG. 3, the electronic musical instrument is provided in its central portion with large display 18, on both sides of which switches SW1 to SW6 are disposed. Each of switches SW1 to SW6 is used for changing the content of an item displayed on large display 18. Six items corresponding to switches SW1 to SW6 are displayed on large display 18, in the example of FIG. 3.

Switch SW1 corresponds to the item of "style", wherein the content "BALLAD1" is now displayed. Switch SW2 corresponds to the item of "style BAR BEAT", wherein "04.03" is now displayed. This indicates a position in an auto-play, i.e., the third beat of the fourth measure (bar). The position can be changed arbitrarily by depressing switch SW2 and then turning dial 14.

Switch SW3 corresponds to the item of "SEQ BAR BEAT", wherein "012.03" is now displayed to indicate a position in the flow pattern of music stored in a sequencer.

Switch SW4 corresponds to the item of "MELO1", wherein "PIANO1" is now displayed. This display can also be changed into that of another musical instrument by depressing switch SW4 and then turning dial 14.

Switch SW5 corresponds to the item of "MELO2", wherein "CELLO" is now displayed. Switch SW6 corresponds to the item of "tempo", wherein "quarter note=120" is now displayed.

Sound volumes of instrument parts are displayed on the lower portion of large display 18. In this example, displayed are sound volumes of "RHY" (rhythm), "BAS" (bass), "ACC" (accompaniment), "MELO1", and "MELO2". Pairs of up and down switches are provided for increasing and decreasing the respective sound volumes. Disk drive 20 is provided for recording or playing back music to auto-play.

Registration switches including a write button are provided for recording set states of this electronic musical instrument. For example, when button "Reg1" is depressed after the write button is depressed, the set state of the electronic musical instrument that is now displayed on large display 18 is recorded on first register "Reg1".

When the user has changed the set state in the course of music being played and likes to record the new set state, he or she depresses the write button and then button "Reg2" so that the new set state is recorded on second register "Reg2".

As mode switches, provided are switches of "Demo", "Concert Magic", "1-2 play", "Effect Edit", "Tone Edit", and "Disk", in this example. "Demo" switch is for playing demo music. "Concert Magic" indicates the function that the sound of a musical composition selected beforehand is reproduced one by one every time a key is depressed.

As function switches, provided are "Key Split" switch 12 and "Harmony Plus" switch 13 in addition to "Help" switch 11 according to the present invention. "Key Split" switch 12 is for splitting keyboard 8 into sets of keys so that each set of keys may be usable separately. "Harmony Plus" indicates the function that, e.g., a chord made on the lower side of keyboard 8 is developed on the upper side.

Figure 4:
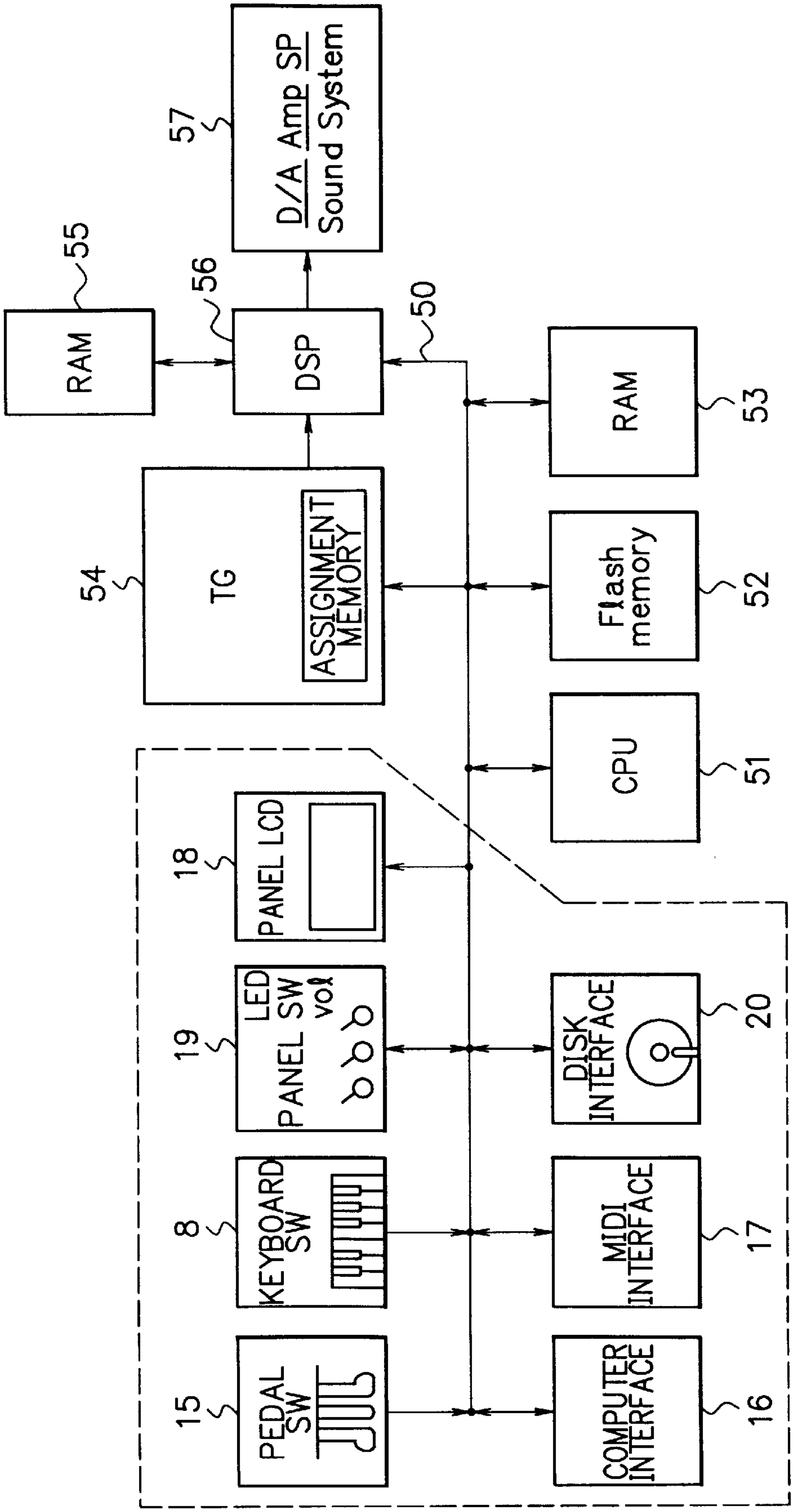
FIG. 4 is a block diagram showing the main components in the electronic musical instrument.

FIG. 4 shows the main components in the electronic musical instrument of FIG. 3. In FIG. 4, pedal switch (SW) 15, keyboard switch (SW) 8, panel switch (SW) 19, panel LCD 18, computer interface 16, MIDI interface 17, and DISK interface 20 correspond to the elements denoted by the same reference numerals in FIG. 3, respectively.

In addition to those, FIG. 4 shows CPU 51, flash memory 52, RAM 53, tone generator 54, DSP (digital signal processor) 56, RAM 55, and sound system 57.

Figure 5:
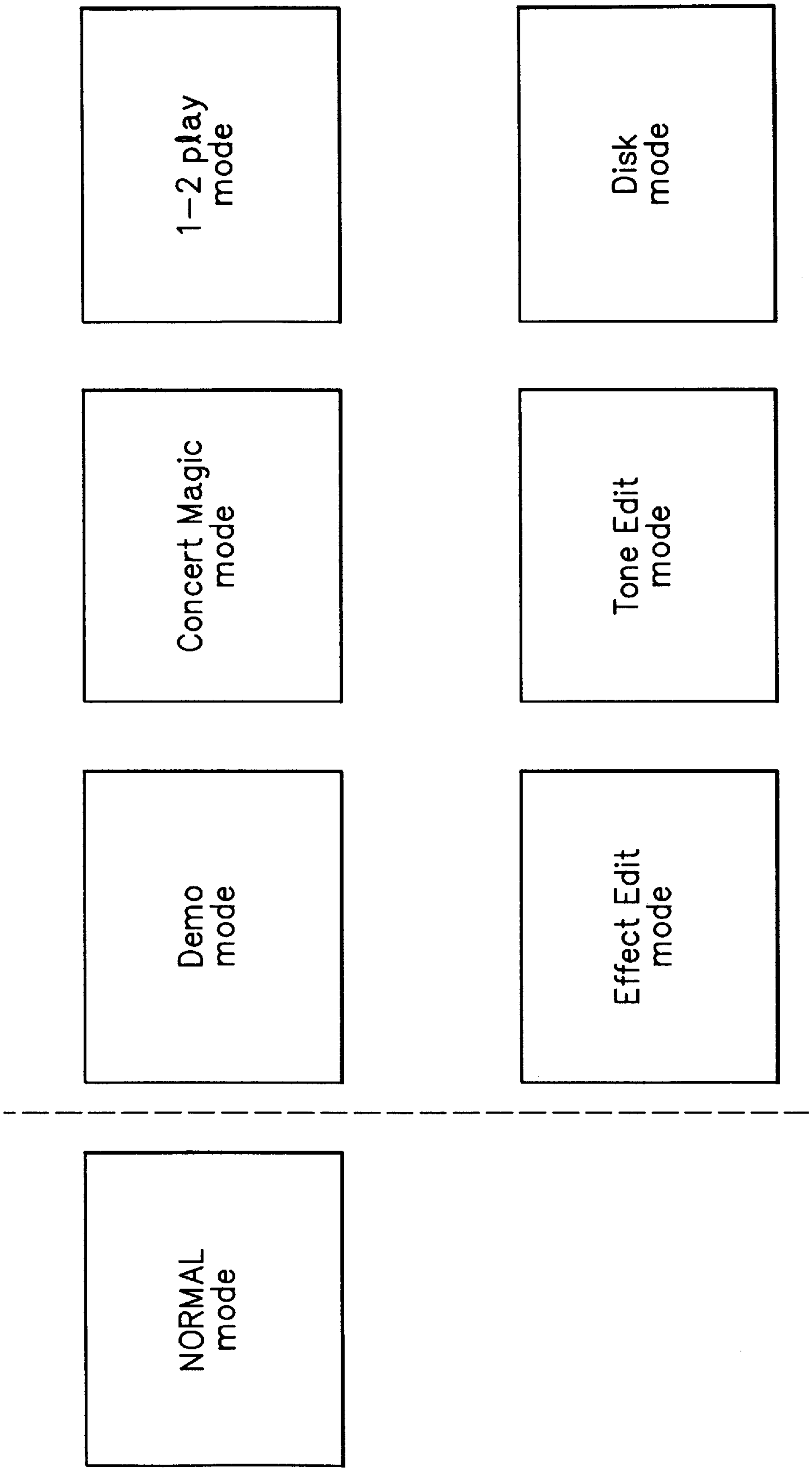
FIG. 5 is a representation for illustrating display pictures corresponding to the respective play modes in an ordinary state for playing.

FIG. 5 shows an example of display corresponding to each play mode. In this electronic musical instrument, provided are modes of "Normal", "Demo", "Concert Magic", "1–2 play", "Effect Edit", "Tone Edit", and "Disk", as described above.

Figure 6:
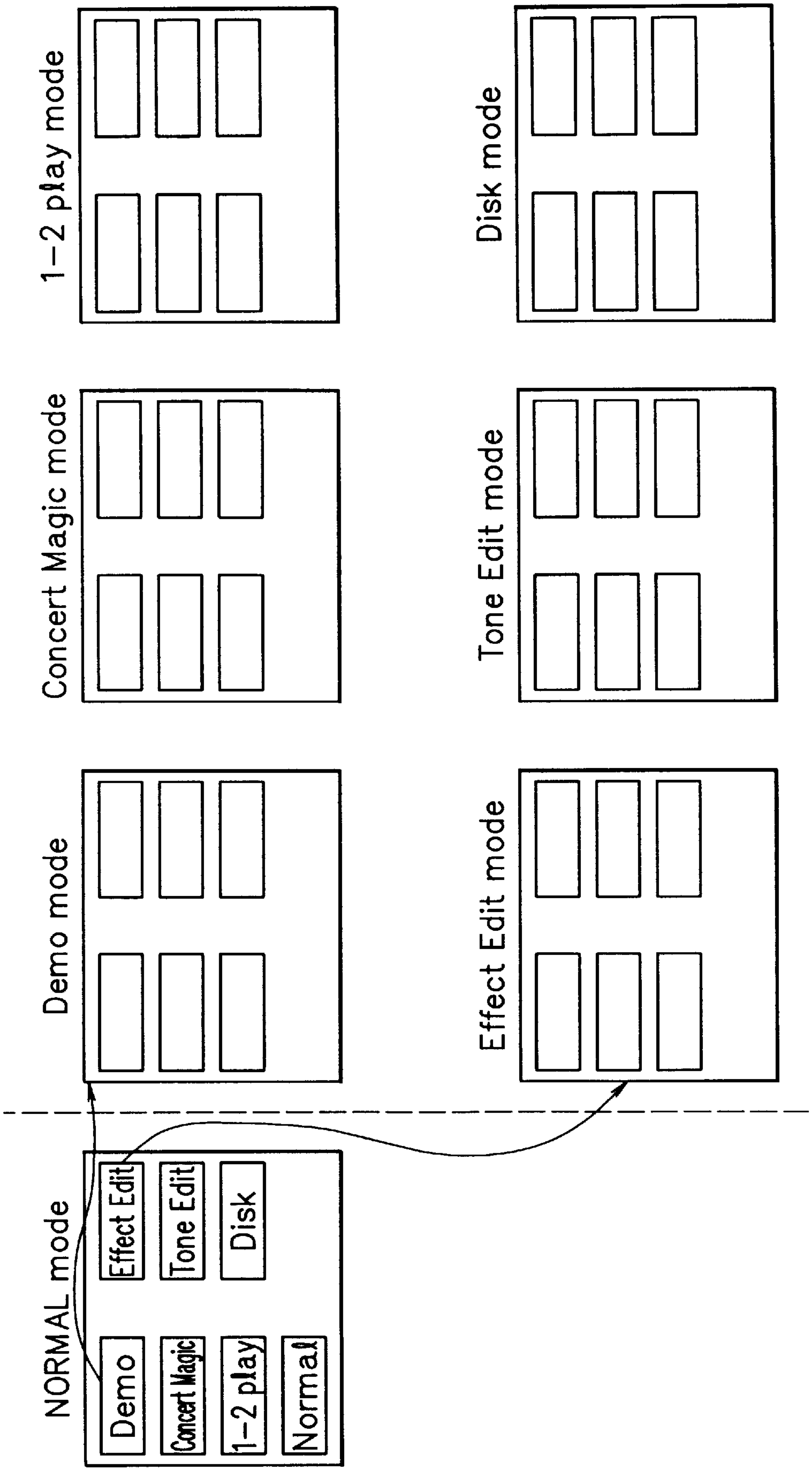
FIG. 6 is a representation for illustrating display pictures corresponding to the respective play modes in a help mode.

FIG. 6 shows an example of display corresponding to each play mode after the help function is started. When the help function is started in the electronic musical instrument operating in "Normal" mode, items of "Demo", "Concert Magic", "1–2 play", "Normal", "Effect Edit", "Tone Edit", and "Disk" are displayed on panel LCD 18.

When one of the switches corresponding to the respective items (the switch corresponding to "Normal" is omitted in FIG. 3) is depressed, a help picture of a table of contents for the corresponding mode is then displayed on panel LCD 18. FIG. 6 shows with arrow lines the cases that a help picture of "Demo" mode is displayed when the switch corresponding to "Demo" is depressed, and a help index picture of "Effect Edit" mode is displayed when the switch corresponding to "Effect Edit" is depressed.

Next, operations of this electronic musical instrument will be described with reference to flowcharts of FIGS. 7 to 11.

Figure 7:
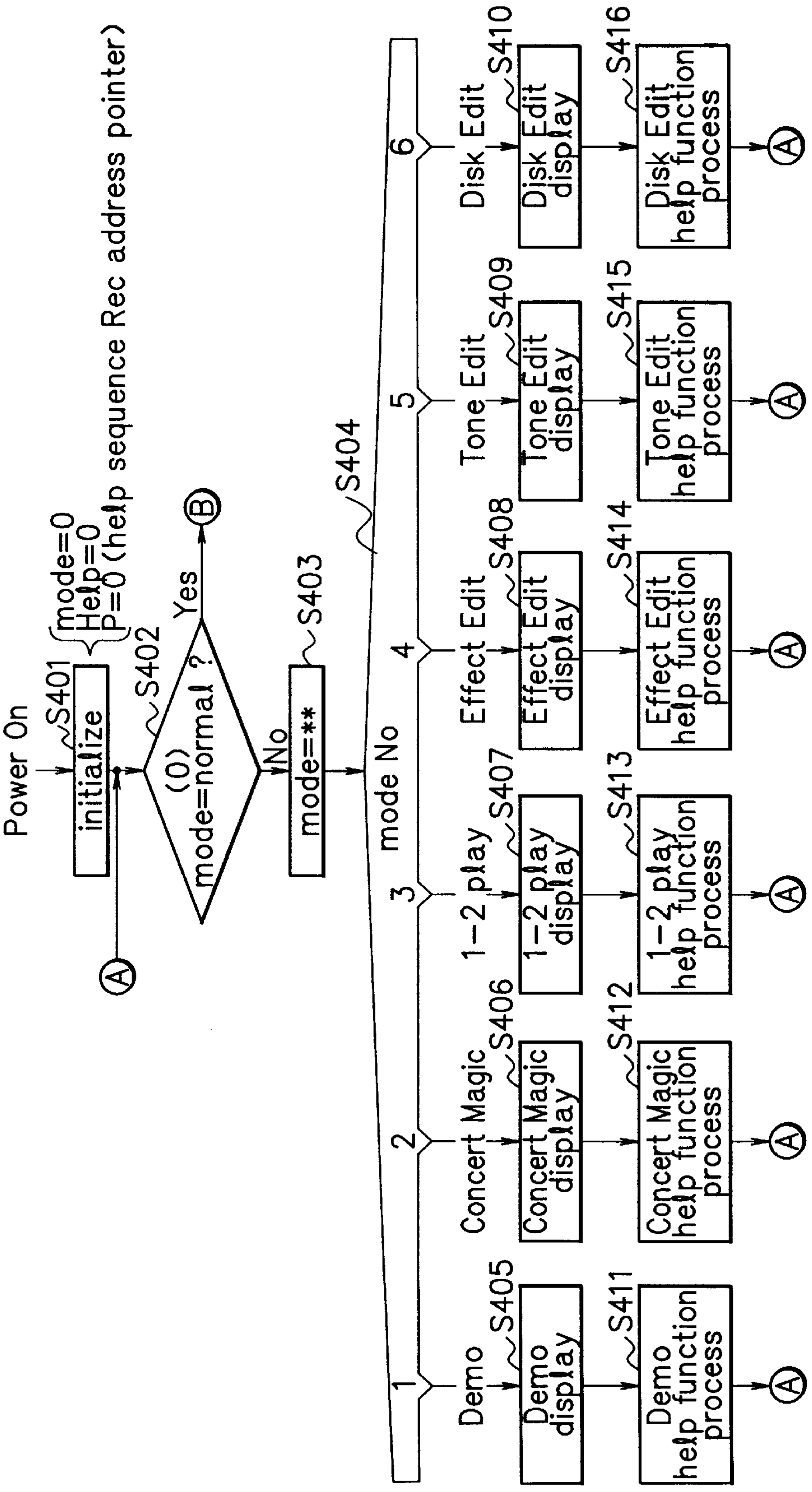
FIG. 7 is a flowchart of the process for entering the help mode from an ordinary playing state.

Referring to FIG. 7, after the power switch (not shown) of the electronic musical instrument is made on, the electronic musical instrument is first initialized in step S401. For example, setting of "mode=0" (normal play mode), "Help=0" (ordinary playing operation), and "P=0" (help sequence record address pointer =0) is made.

Next, in step S402, it is judged whether or not the present mode is normal play mode. If not, the present mode number is then stored in a mode register, in step S403.

Next, in step S404, the mode number is judged to display a picture corresponding to the mode number. For example, when the mode number is "1 ", the flow then advances to step S405, wherein a picture of "Demo" mode is displayed. When the mode number is "2", the flow then advances to step S406, wherein a picture of "Concert Magic" mode is displayed. When the mode number is "3", the flow then advances to step S407, wherein a picture of "1–2 play" mode is displayed. When the mode number is "4", the flow then advances to step S408, wherein a picture of "Effect Edit" mode is displayed. When the mode number is "5", the flow then advances to step S409, wherein a picture of "Tone Edit" mode is displayed. When the mode number is "6", the flow then advances to step S410, wherein a picture of "Disk Edit" mode is displayed.

When any of the above pictures is displayed and an item in the displayed picture is selected, the help function process corresponding to the displayed mode is then executed in the corresponding one of steps S411 to S416.

Figure 8:
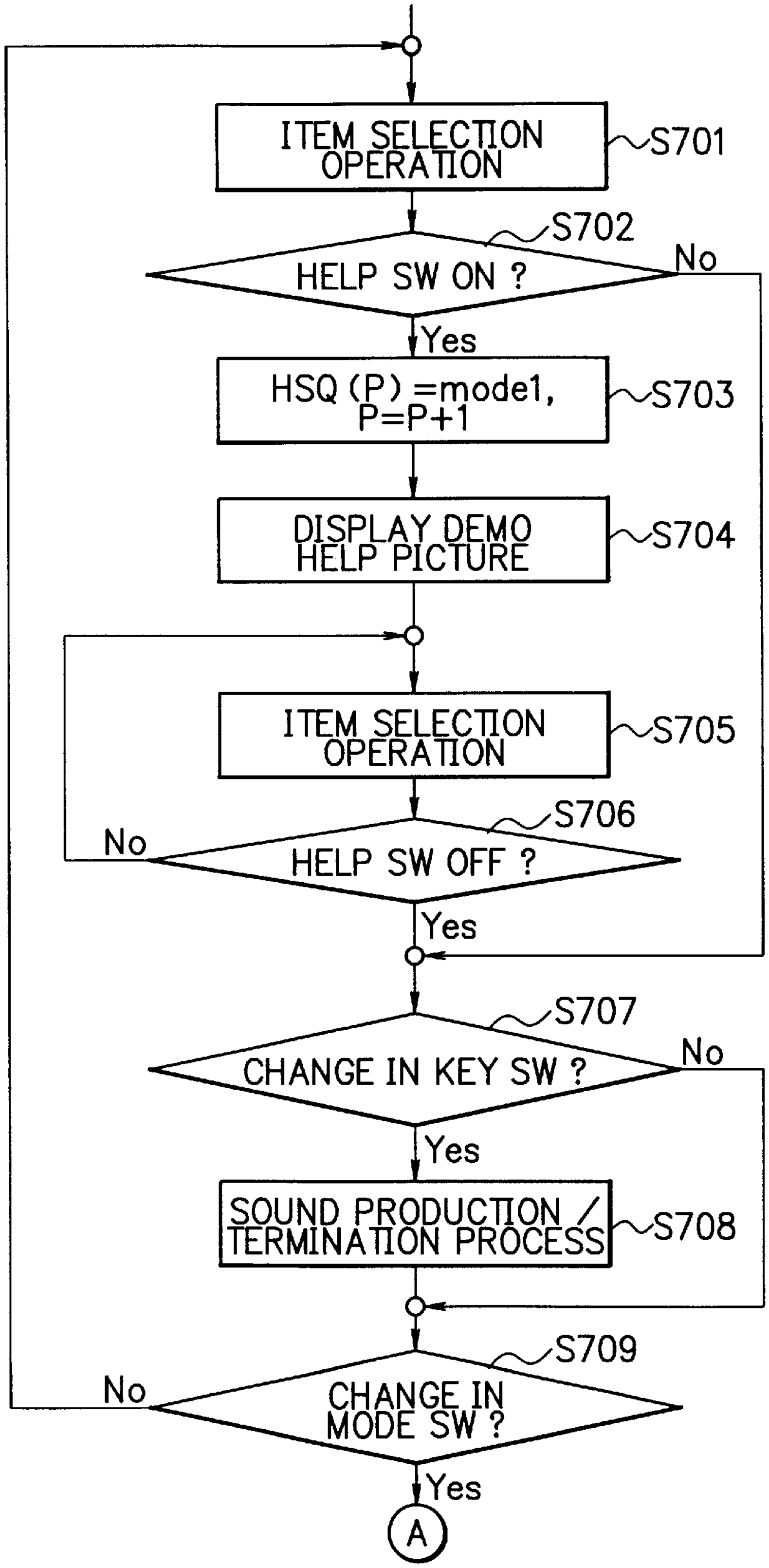
FIG. 8 is a flowchart of the process in the help function corresponding to "Demo" mode.

For example, the help function process of "Demo" mode is shown in FIG. 8. Referring to FIG. 8, first executed is a process according to an operation for selecting an item in the picture by, e.g., an up/down operation of the cursor in the picture and an operation of dial 14, in step S701.

Next, in step S702, it is checked whether or not a help switch has been made ON.

Note that the expression "help switch is made ON" does not always mean that actual help switch 11 is made on, but mean that a flag called help switch (a memory content under the control of CPU) is set in the ON state. The help flag has the following relation to the actual help switch, in general. The help flag is set in the ON state when the actual help switch is depressed once, and the ON state is kept unless the actual help switch is depressed again (a toggle operation by ON events).

When the help switch has been made ON, the flow then advances to step S703, wherein the address of the help sequencer is set to "mode=1", i.e., in the "Demo" help function state, and then the pointer (P) of the help sequencer is advanced by one.

Next, in step S704, a help picture for "Demo" mode is displayed. That is, in this embodiment, when the help switch is made ON in the electronic musical instrument operating in "Demo" mode, the help picture for "Demo" mode is displayed at once. After this, in step S705, displayed is the content of help function according to an operation for selecting an item in the "Demo" help picture.

Next, in step S706, it is checked whether or not the help switch has been made OFF. When the help switch has not yet been made OFF, the flow then returns to step S705 to repeat the process of steps S705 and S706.

When the help switch has been made OFF, it is then checked in step S707 whether or not an event (ON or OFF) on the key switches has arisen. When such a key event is detected, a process for sound production or termination corresponding to the operated key is then executed in step S708. When no key event is detected, the flow then jumps to step S709.

In step S709, it is checked whether or not a mode switch has been operated. When an operation of a mode switch is detected, the flow then returns to (A) of FIG. 7. When any mode switch has not been operated, the flow then returns to step S701 to repeat the process of steps S701 to S709 as described above.

Figure 9:
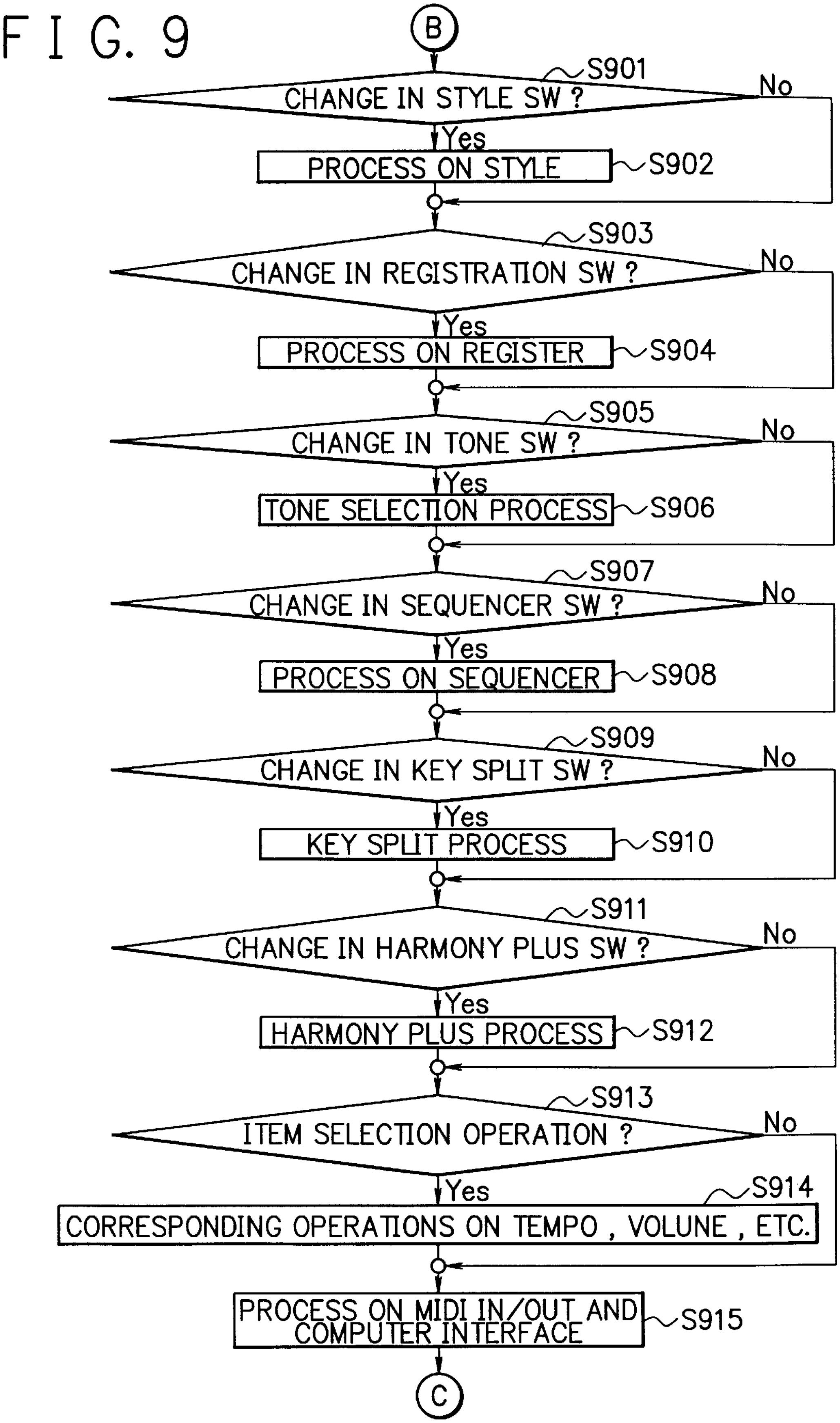
FIG. 9 is a flowchart of part of the main process in the electronic musical instrument.

When it has been judged in step S402 of FIG. 7 that the present play mode is normal mode, it is then checked in step S901 of FIG. 9 whether or not there is a change in style switches. When a change in the style switches is detected, a process on style, e.g., for changing the present rhythm style is then executed in step S902.

Next, in step S903, it is checked whether or not there is a change in registration switches. When a change in the registration switches is detected, a process of, e.g., storing data in a register or reading out data from a register to develop it on tone or style, is then executed in step S904.

Next, in step S905, it is checked whether or not there is a change in tone switches. When such a change is detected, a tone selection process is then executed in step S906.

Next, in step S907, it is checked whether or not there is a change in sequencer switches. When such a change is detected, a sequencer record/playback process is then executed in step S908.

Next, in step S909, it is checked whether or not there is a change in key split switch 12. When such a change is detected, a key split process is then executed in step S910.

Next, in step S911, it is checked whether or not there is a change in harmony plus switch 13. When such a change is detected, a harmony plus process is then executed in step S912.

Next, in step S913, it is checked whether or not an operation for selecting an item by, e.g., an up/down operation of the cursor in the picture or an operation of dial 14 has been performed. When such an operation is detected, a process for setting a tempo, a volume, or the like in accordance with the operation is then executed in step S914.

Next, in step S915, executed is a process for a signal having been input through MIDI IN/OUT 17 or computer interface 16, if any.

Figure 10:
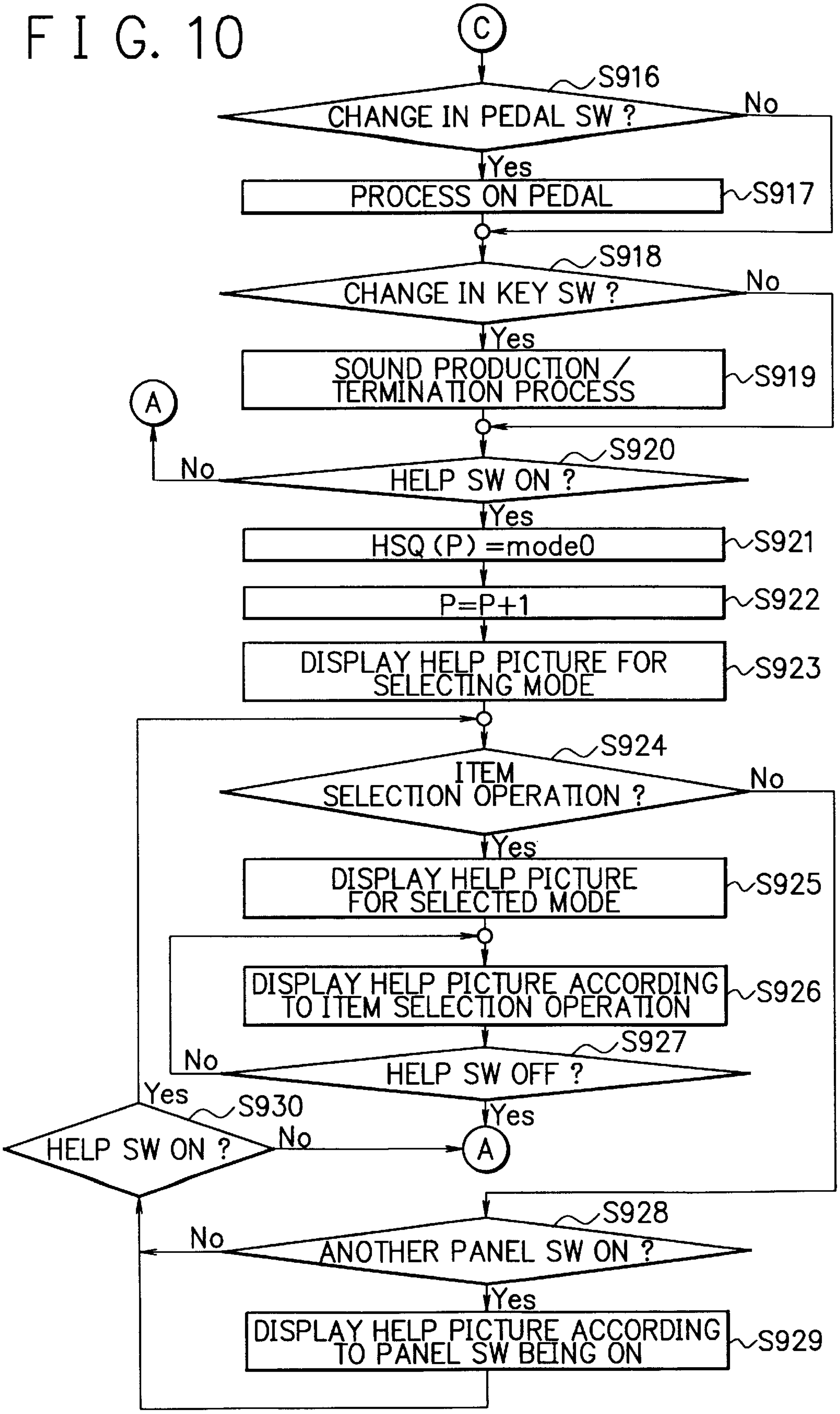
FIG. 10 is a flowchart of another part of the main process in the electronic musical instrument.

Next, in step S916 of FIG. 10, it is checked whether or not there is a change in pedal switches 15. When such a change is detected, a process on pedal is then executed in step S917.

Next, in step S918, it is checked whether or not there is a change in key switches. When such a change is detected, a process for sound production or termination in accordance with the change is then executed in step 919.

Next, in step S920, it is checked whether or not there is a change in the help switch. When such a change is detected, the pointer (P) of help sequencer (HSQ) is then set to "mode 0", in step S921, and then the pointer (P) is advanced by one, in step S922.

Next, in step S923, a help picture for selecting a mode is displayed.

Next, in step S924, it is checked whether or not an operation for selecting a mode has been performed. When such an operation is detected, a help picture of the selected mode is then displayed, in step S925.

Next, in step S926, displayed is a new help picture in accordance with an operation for selecting an item in the help picture that has been displayed till now. This step is repeated unless the help switch having been made OFF is detected in step S927.

When no operation for selecting a mode is detected in step S924, it is then checked in step S928 whether or not another panel switch is made ON. When no panel switch is made ON, the flow then advances to step S930. When an ON event of a panel switch is detected, the related help picture is then displayed in step S929.

Next, in step S930, it is checked whether or not the help switch has been made ON. When the help switch has been made ON, the flow then returns to (A) of FIG. 7. When the help switch has not been made ON, the flow then returns to step S924 to repeat the process of steps S924 to S930.

Figure 11:
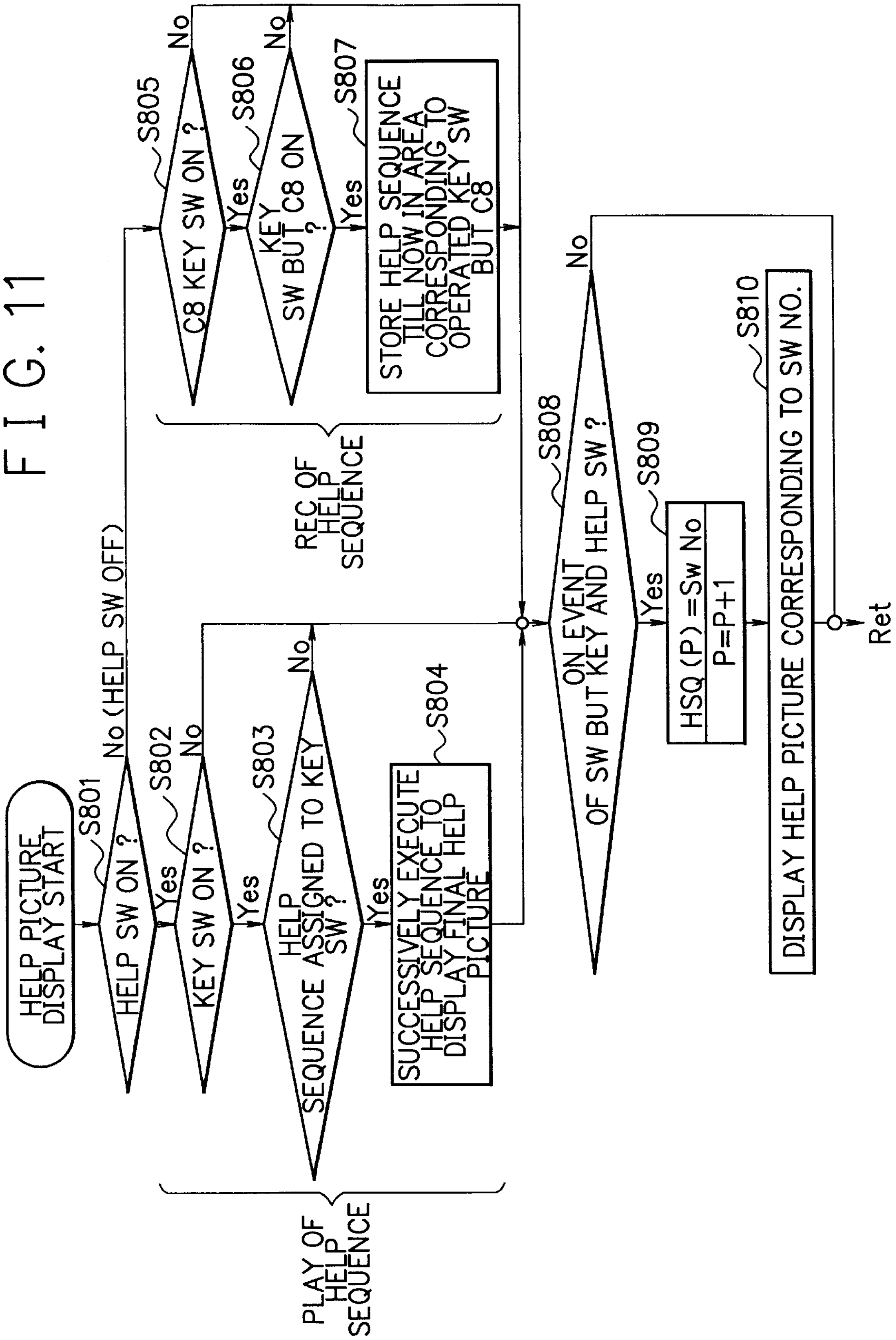
FIG. 11 is a flowchart of a process for displaying a help picture.

FIG. 11 shows a flowchart of the process common to all play modes executed after a help picture is displayed.

Referring to FIG. 11, after a help picture is displayed, it is first checked in step S801 whether or not the help switch has been made ON. When the help switch has been made ON, it is then checked in step S802 whether or not a key switch has been made ON.

An ON event of a key switch in the state that the help switch has been made ON is not for sound production but for reading out a sequence. So, when an ON event of a key switch is detected in step S801, it is then checked in step S803 whether or not a help sequence has been assigned to the operated key switch. When a help sequence has been assigned to the key switch, the help sequence is successively read out to display the final help picture, in step S804.

When it has been judged in step S801 that the help switch is OFF though the help function has been started, it is then checked in step S805 whether or not "C8" key switch corresponding to the rightmost key on keyboard 8 has been made ON.

An ON event of "C8" key switch in this state is for assigning the help sequence till now to a key switch but "C8" key switch. So, when such an ON event of "C8" key switch is detected, it is then checked in step S806 whether or not a key switch but "C8" key switch has been made ON.

When an ON event of a key switch but "C8" key switch is detected, the contents of the help sequence having been performed till now are stored in the area of the register corresponding to the operated key switch.

Next, in step S808, it is checked whether or not there is an ON event of a switch but the key and help switches. When such an ON event is detected, the number of the operated switch is stored in the storage area in accordance with the present position of the pointer of the help sequencer, and then the pointer is advanced by one, in step S809.

Next, in step S810, the help picture corresponding to the switch number is displayed. The flow then returns to the main routine.

In the above explanation, when a help sequence is played back in step S804, it is successively read out to display the final help picture only. But, it may gradually be read out to display help pictures one by one every time a key switch is depressed.

Help SEQ Rec/Play in this embodiment is for recording and playing back the sequence of user's operations intact. But, as a simpler method, it may be possible to record and play back only data of the final help picture. In this case, when a help SEQ play switch is operated, the corresponding final help picture can be displayed at once. As such, the memory capacity can be decreased. However, when the CPU changes the display from the final help picture to another picture, the CPU must check the information on the picture possible to display at that time because the final help picture has been displayed by a jump process.

In this embodiment, for storing the sequence after the help function is started, it is necessary to depress "C8" key switch and another key switch to assign the sequence. But, as a simpler method, it may be possible automatically to store the sequence in the area corresponding to a key not yet assigned when the help mode is ended (the help switch is made OFF).

If such key numbers are stored and read out (pushed and popped) in FIFO (first in and first out) method, it may be possible to play back the help sequence in order from the latest stored content to the newest one by operating only a single common help SEQ play switch.

As described above, an electronic musical instrument according to the present invention has play modes and a help function in which a help picture is displayed in accordance with each of the play modes. The play modes include a normal play mode. The electronic musical instrument comprises help function instruction means for instructing to start the help function; help function start means for starting the help function when it is instructed with the help function instruction means; and display control means for displaying a picture for selecting one of the play modes when the help function is started in the normal play mode, and a help picture corresponding to one of the play modes but the normal play mode when the help function is started in the corresponding play mode.

This feature of the present invention produces the effect that a user can search and know the functions of the electronic musical instrument systematically even with no manual. Besides, since an aimed help picture of the play mode in the electronic musical instrument being operating can be displayed at once, labor and time used for searching for the aimed help picture can be saved.

The electronic musical instrument can further comprise switches which have been assigned functions for playing and at least part of which are further assigned roles in the help function and used in the help function only for performing the roles. This feature of the present invention produces the effect of relieving a load on the processor in the electronic musical instrument and improving its processing speed.

In case that the above switches includes key switches respectively corresponding to keys on a keyboard, part of the key switches may be left usable for producing sounds even in the help function. This feature of the present invention produces the effect that a user can make the electronic musical instrument produce an actual sound when he or she uses the help function.

An electronic musical instrument according to another aspect of the present invention comprises storage means for storing a sequence of operations performed after the help function is started till a predetermined help picture is displayed; reproduction means for reproducing a sequence of operations stored in the storage means; and display control means for displaying a predetermined help picture in accordance with a sequence of operations reproduced by the reproduction means.

This feature of the present invention produces the effect that a user can find his or her aiming help picture immediately once he or she has made, e.g., a storing medium store the sequence of operations for obtaining the help picture.

Such sequences of operations can be stored with being related to operation members, respectively. This feature of the present invention produces the effect that a sequence of operations can easily be stored and read out only by operating the corresponding operation member.

What is claimed is:

1. An electronic musical instrument having play modes and a help function in which a help index picture is displayed in accordance with each of said play modes, said play modes including a normal play mode, said instrument comprising:

help function instruction means for instructing to start said help function;

help function start means for starting said help function when it is instructed with said help function instruction means; and display control means for displaying a picture for selecting one of said play modes when said help function is started in said normal play mode, and a help index picture corresponding to one of said play modes other than said normal play mode, without displaying said picture for selecting one of said play modes, when said help function is started in the corresponding play mode.

2. An electronic musical instrument according to claim 1, wherein said instrument further comprises switches which have been assigned functions for playing and at least part of which are further assigned roles in said help function and used in said help function only for performing said roles.

3. The electronic musical instrument according to claim 2, wherein said instrument further comprises a keyboard including keys, and said switches includes key switches respectively corresponding to said keys, and part of said key switches are used in said help function for producing sounds.

4. The electronic musical instrument according to claim 1, wherein said display control means displays a help index picture corresponding to said normal play mode after displaying said picture for selecting one of said play modes when said help function is started in said normal play mode.

5. An electronic musical instrument having play modes and a help function in which a help picture is displayed in accordance with each of said play modes, said instrument comprising:

storage means for storing a sequence of operations performed after said help function is started till a predetermined help picture is displayed;

reproduction means for reproducing the sequence of operations stored in said storage means; and display control means for displaying a predetermined help picture in accordance with the sequence of operations reproduced by said reproduction means.

6. The electronic musical instrument according to claim 5, further comprising operation members each of which are independently used for storing a sequence of operations.

7. An electronic musical instrument having play modes and a help function, said play modes including a normal play mode, said help function having hierarchical structures respectively corresponding to said play modes, said instrument comprising:

a help function operation member to be used for starting said help function;

a help function start means for starting said help function when said help function operation member is operated; and control means for displaying a help picture of a first hierarchy corresponding to said normal play mode for selecting one of said play modes when said help function is started in said normal play mode and displaying a help index picture of a first hierarchy corresponding to one of said play modes other than said normal play mode, without displaying said help picture for selecting one of said play modes, when said help function is started in the corresponding play mode.

8. The electronic musical instrument according to claim 7, further comprising item selection means for selecting an item displayed in s help picture of a hierarchy corresponding to one of said play modes, so as to change the help picture into a new help picture of a next hierarchy corresponding to one of said play modes in accordance with the selected item.

9. The electronic musical instrument according to claim 8, further comprising help sequence storage means for storing a sequence of operations in an order of hierarchies performed after the help function is started till an aimed help picture is displayed.

10. The electronic musical instrument according to claim 9, further comprising operation members that are related to sequences of operations being stored, respectively.

* * * * *

UNITED STATES PATENT AND TRADEMARK OFFICE

CERTIFICATE OF CORRECTION

PATENT NO. : 6,188,009 B1 Page 1 of 1
DATED : February 13, 2001
INVENTOR(S) : Tsutomu Saito and Shu Eitaki It is certified that error appears in the above-identified patent and that said Letters Patent is hereby corrected as shown below:

Title page,
Item [57], ABSTRACT,
Line 7, after "mode but" insert -- is not in --.

Drawings,
FIG. 9, Sheet 9, in box S914 change "VOLUNE" to -- VOLUME --.

Column 10,
Line 46, after "in" replace "s" with -- a --.

Signed and Sealed this

Twenty-fourth Day of September, 2002

*Attest:*

JAMES E. ROGAN

*Attesting Officer* *Director of the United States Patent and Trademark Office*